(12) United States Patent
Gutierrez

(10) Patent No.: US 9,281,763 B2
(45) Date of Patent: Mar. 8, 2016

(54) ROW AND COLUMN ACTUATOR CONTROL

(75) Inventor: Roman C. Gutierrez, Arcadia, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 585 days.

(21) Appl. No.: 13/247,902

(22) Filed: Sep. 28, 2011

(65) Prior Publication Data
US 2013/0076273 A1 Mar. 28, 2013

(51) Int. Cl.
*H02N 1/08* (2006.01)
*H02N 1/00* (2006.01)

(52) U.S. Cl.
CPC ............... *H02N 1/006* (2013.01); *H02N 1/008* (2013.01)

(58) Field of Classification Search
CPC ................................. H02N 1/00; H02N 1/008
USPC ........... 310/309; 361/290; 318/116; 381/191; 307/400; 73/780
See application file for complete search history.

(56) References Cited

U.S. PATENT DOCUMENTS

| | | | |
|---|---|---|---|
| 3,636,278 A * | 1/1972 | Heil | 381/163 |
| 4,333,722 A | 6/1982 | Lee | |
| 4,382,196 A * | 5/1983 | Miller et al. | 307/400 |
| 4,384,778 A | 5/1983 | Lee et al. | |
| 4,408,857 A | 10/1983 | Frank | |
| 4,496,217 A | 1/1985 | Aoyagi | |
| 4,654,546 A * | 3/1987 | Kirjavainen | 307/400 |
| 4,716,432 A | 12/1987 | Stephany | |
| 4,860,040 A | 8/1989 | Tamamura et al. | |
| 5,150,260 A | 9/1992 | Chigira | |
| 5,206,557 A * | 4/1993 | Bobbio | 310/309 |
| 5,386,294 A | 1/1995 | Ototake et al. | |
| 5,699,621 A | 12/1997 | Trumper et al. | |
| 5,757,090 A * | 5/1998 | Kirjavainen | 307/400 |
| 5,825,560 A | 10/1998 | Ogura et al. | |
| 5,986,826 A | 11/1999 | Kosaka et al. | |
| 6,033,131 A | 3/2000 | Ghosh et al. | |
| 6,068,801 A | 5/2000 | Bodo et al. | |
| 6,205,267 B1 | 3/2001 | Aksyuk et al. | |
| 6,262,827 B1 | 7/2001 | Ueda et al. | |
| 6,327,855 B1 * | 12/2001 | Hill et al. | 60/528 |
| 6,392,703 B1 | 5/2002 | Uchino et al. | |
| 6,411,013 B1 * | 6/2002 | Horning | 310/330 |
| 6,426,777 B1 | 7/2002 | Sato | |
| 6,497,141 B1 | 12/2002 | Turner et al. | |
| 6,535,311 B1 | 3/2003 | Lindquist | |
| 6,674,383 B2 | 1/2004 | Horsley et al. | |

(Continued)

FOREIGN PATENT DOCUMENTS

| | | | | |
|---|---|---|---|---|
| EP | 1239580 | * | 9/2002 | ............... H02N 1/00 |
| WO | 2009127275 | * | 10/2009 | ............... H02N 1/00 |

OTHER PUBLICATIONS

PCT/US 06/07024 Search Report of Nov. 28, 2007.

(Continued)

*Primary Examiner* — Burton Mullins
(74) *Attorney, Agent, or Firm* — Haynes and Boone, LLP

(57) ABSTRACT

In one embodiment, a device is provided that includes: a plurality of actuators arranged into a plurality of rows and a plurality of columns; a plurality of row conductors corresponding to the plurality of rows; a plurality of column conductors corresponding to the plurality of columns; and a controller configured to select at least one of the actuators in a row by raising a voltage on the corresponding row conductor to couple each selected actuator to its corresponding column conductor.

10 Claims, 15 Drawing Sheets

(56) References Cited

U.S. PATENT DOCUMENTS

| | | | |
|---|---|---|---|
| 6,675,671 B1 | 1/2004 | Jokiel et al. | |
| 6,705,165 B2 * | 3/2004 | Garverick et al. | 73/514.18 |
| 6,750,589 B2 * | 6/2004 | Cabuz | 310/309 |
| 6,847,907 B1 | 1/2005 | Novotny | |
| 6,850,675 B1 | 2/2005 | Calvet et al. | |
| 6,914,635 B2 | 7/2005 | Ostergard | |
| 6,958,777 B1 | 10/2005 | Pine | |
| 7,027,206 B2 | 4/2006 | Mochizuki | |
| 7,038,150 B1 | 5/2006 | Polosky et al. | |
| 7,113,688 B2 | 9/2006 | Calvet et al. | |
| 7,154,199 B2 | 12/2006 | Yasuda | |
| 7,266,272 B1 | 9/2007 | Calvet et al. | |
| 7,285,879 B2 | 10/2007 | Osaka | |
| 7,372,074 B2 | 5/2008 | Milne et al. | |
| 7,545,591 B1 | 6/2009 | Tong et al. | |
| 7,555,210 B2 | 6/2009 | Calvet | |
| 7,646,969 B2 | 1/2010 | Calvet et al. | |
| 7,705,909 B2 | 4/2010 | Ishizawa et al. | |
| 7,720,366 B2 | 5/2010 | Iwasaki et al. | |
| 7,729,036 B2 * | 6/2010 | Felnhofer et al. | 359/290 |
| 7,838,322 B1 | 11/2010 | Vargo et al. | |
| 7,990,628 B1 | 8/2011 | Calvet et al. | |
| 2001/0004420 A1 | 6/2001 | Kuwana et al. | |
| 2002/0006687 A1 | 1/2002 | Lam | |
| 2002/0070634 A1 | 6/2002 | Tai et al. | |
| 2002/0105699 A1 | 8/2002 | Miracky et al. | |
| 2002/0125789 A1 | 9/2002 | Brandt | |
| 2003/0048036 A1 | 3/2003 | Lemkin | |
| 2003/0062422 A1 | 4/2003 | Fateley et al. | |
| 2003/0076421 A1 | 4/2003 | Dutta | |
| 2003/0086751 A1 | 5/2003 | Culpepper | |
| 2003/0210116 A1 | 11/2003 | Lane et al. | |
| 2004/0048410 A1 | 3/2004 | O'Brien et al. | |
| 2004/0066494 A1 | 4/2004 | Lee et al. | |
| 2004/0140733 A1 * | 7/2004 | Keller | 310/309 |
| 2004/0183936 A1 | 9/2004 | Kim et al. | |
| 2004/0189969 A1 | 9/2004 | Mizuno | |
| 2004/0201773 A1 | 10/2004 | Ostergard | |
| 2005/0002008 A1 | 1/2005 | De Weerdt et al. | |
| 2005/0002086 A1 | 1/2005 | Starkweather et al. | |
| 2005/0007489 A1 | 1/2005 | Ahn et al. | |
| 2005/0095813 A1 | 5/2005 | Zhu et al. | |
| 2005/0139542 A1 | 6/2005 | Dickensheets et al. | |
| 2005/0148433 A1 | 7/2005 | Wang et al. | |
| 2005/0219399 A1 | 10/2005 | Sato et al. | |
| 2005/0249487 A1 | 11/2005 | Gutierrez | |
| 2006/0028320 A1 | 2/2006 | Osaka | |
| 2006/0033938 A1 | 2/2006 | Kopf et al. | |
| 2006/0183332 A1 | 8/2006 | Kang | |
| 2006/0192858 A1 | 8/2006 | Calvet | |
| 2006/0193618 A1 | 8/2006 | Calvet | |
| 2006/0204242 A1 | 9/2006 | Gutierrez et al. | |
| 2006/0209012 A1 | 9/2006 | Hagood, IV | |
| 2006/0219006 A1 | 10/2006 | Nasiri et al. | |
| 2006/0250325 A1 * | 11/2006 | Hagood et al. | 345/55 |
| 2007/0133976 A1 | 6/2007 | Gutierrez | |
| 2008/0020573 A1 | 1/2008 | Birkmeyer et al. | |
| 2008/0044172 A1 | 2/2008 | Tang et al. | |
| 2010/0232777 A1 | 9/2010 | Tseng et al. | |
| 2010/0284081 A1 | 11/2010 | Gutierrez et al. | |
| 2011/0026148 A1 | 2/2011 | Tanimura et al. | |
| 2011/0199147 A1 * | 8/2011 | Ikehashi | 327/427 |
| 2011/0248601 A1 * | 10/2011 | Pirk et al. | 310/300 |
| 2013/0076275 A1 * | 3/2013 | Cohen et al. | 318/116 |

OTHER PUBLICATIONS

Akihiro Koga et al. "Electrostatic Linear Microactuator Mechanism for Focusing a CCD Camera"; Journal of Lightwave Technology, vol. 17, No. 1: p. 43-47; Jan. 1999.

Chapter 2: Electrical Microactuators, Apr. 11, 2005.

Polymems Actuator: A Polymer-Based Microelectromechanical (MEMS) Actuator with Macroscopic Action, Honeywell International Incorporated, Final Technical Report, Sep. 2002.

Measuring Capacitance: Methods (Fwd); Apr. 26, 1998 http://www.pupman.com/listarchives/1998/April/msg00625.html.

Fernandez, Daniel, et al., Pulse-Drive and Capacitive Measurement Circuit for MEMS Electrostatic Actuators, Stresa, Italy, Apr. 25-27, 2007.

Improving Test Efficiency of MEMS Electrostatic Actuators Using the Agilent E4980A Precision LCR Meter, Agilent Technologies, Inc., Apr. 12, 2007.

* cited by examiner

ROW AND COLUMN ACTUATOR CONTROL

TECHNICAL FIELD

One or more embodiments relate generally to control of microelectromechanical systems (MEMS) and, more particularly, to control of MEMS actuators using a row and column architecture.

BACKGROUND

There are two main types or categories of electrostatic MEMS actuators. A first type is denoted as gap-closing or parallel-plate MEMS actuators whereas a second type is denoted as an electrostatic comb actuator. As suggested by the name, a parallel-plate actuator includes two or more opposing plates. The plates are configured in the actuator such that a gap between them is closed as one plate is charged positively (or negatively) with respect to the opposing plate. Gap-closing actuators offer considerable actuation force as the electrostatic attraction between two opposite charges is inversely proportional to the square of the separation distance according to Coulomb's law. Thus as the gap separation is reduced towards zero, the electrostatic attractive force is markedly increased. Conversely, the electrostatic attractive force is markedly lowered as the gap separation is increased from zero. Thus, there is a relatively small range of travel for a conventional gap-closing actuator as the plates cannot be pulled too far apart from each other prior to actuation.

In contrast to gap-closing actuators, the separation between fingers in an electrostatic comb does not change. Rather than have the gap change, an electrostatic comb actuator varies the amount of overlap or interdigitation between the comb fingers. This interdigitation can occur over a relatively large range, depending upon the length of the comb fingers. Thus, comb actuators typically offer much better travel than gap-closing actuators. However, since the gap does not close, electrostatic combs are relatively weak in comparison to gap-closing actuators.

There is thus a need in the art for gap-closing actuators that provide the travel advantages of a comb actuator. In addition, there is a need in the art for the control of such improved gap-closing actuators.

SUMMARY

Methods and systems for controlling microelectromechanical systems (MEMS) actuators, such as cascaded electrostatic actuators, are discussed. Such electrostatic actuators can be used to move lenses or to actuate shutters in cameras, for example. Such electrostatic actuators can be used in any desired application.

In accordance with a first embodiment, a device is provided that includes: a cascaded electrostatic actuator defining a stack in a substrate having a plurality of isolated plates, each isolated plate being substantially surrounded by a corresponding gap between the isolated plate and the substrate; and a controller configured to drive the cascaded electrostatic actuator to open and close selected ones of the gaps.

In accordance with a second embodiment, a method is provided that includes: selecting at least one electrostatic actuator for actuation from a plurality of electrostatic actuators, the electrostatic actuators being arranged in rows and columns corresponding to a plurality of row and column conductors, and driving the selected actuator by raising the voltage on the corresponding row conductor to couple the selected actuator to the corresponding column conductor.

In accordance with a third embodiment, a method of controlling a cascaded actuator having a plurality of gaps formed by a stack of parallel plates within a substrate is provided that includes: driving the cascaded actuator with successive pulses of a first voltage to successively close the gaps.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 20b shows an actuator position responsive to the pulse waveform of FIG. 20a.

Embodiments of the invention and their advantages are best understood by referring to the detailed description that follows. It should be appreciated that like reference numerals are used to identify like elements illustrated in one or more of the figures.

DETAILED DESCRIPTION

To provide greater travel in a gap-closing actuator design, gap-closing actuators are stacked to provide what is denoted herein as a cascaded electrostatic actuator. Systems and methods are disclosed herein to provide control of microelectromechanical systems (MEMS) cascaded electrostatic actuators and applications therefor. In accordance with an embodiment of the invention, a cascaded electrostatic actuator can comprise a plurality of alternating fingers, electrodes, plates, or layers upon which opposite charges can be placed so as to cause the alternating layers to move toward one another.

Embodiments of the actuator can be controlled, for example, to move a shutter in a miniature camera to at least partially define an exposure and/or to move one or more lenses in a miniature camera to effect focus, zoom, or optical image stabilization (OIS). Embodiments of the actuator can be used to move or actuate various MEMS and non-MEMS devices.

Figure 1:
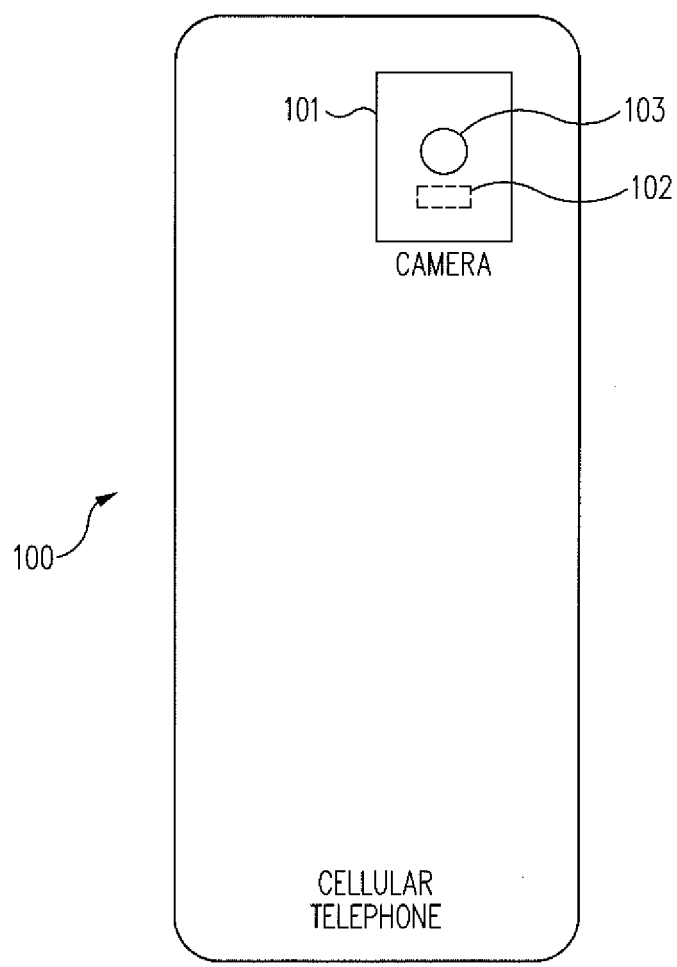
FIG. 1 shows a cellular telephone, in accordance with an embodiment.

FIG. 1 shows a cellular telephone 100, in accordance with an embodiment. The cellular telephone 100 can comprise a miniature camera 101. The miniature camera 101 can comprise a cascaded electrostatic actuator 102 controlled to move at least one lens (such as lens 2801 of FIG. 28) of a lens assembly 103. Such movement can effect focusing, zooming, and/or image stabilization, for example.

Figure 2:
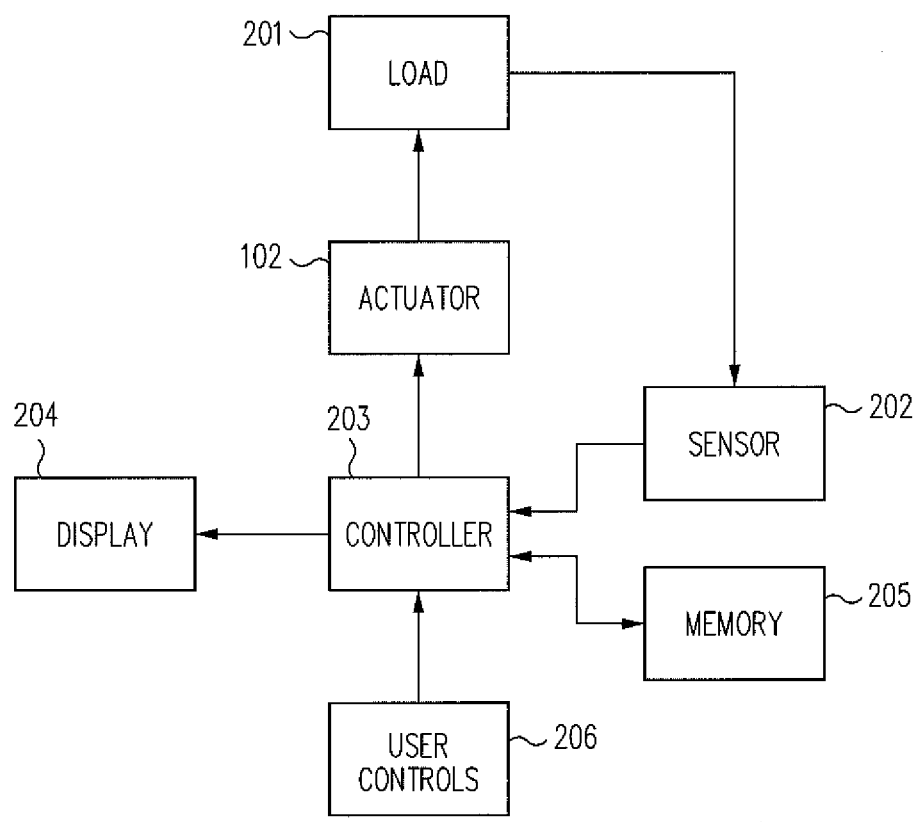
FIG. 2 is a block diagram of an actuator system, in accordance with an embodiment.

FIG. 2 is a block diagram of a cascaded electrostatic actuator system, in accordance with an embodiment. The cascaded electrostatic actuator 102 can move a load 201. The load 201 can be the lens 2801 of the lens assembly 103 for FIG. 1, for example. The actuator 102 is controlled by a controller 203.

The controller 203 can be a microprocessor, such as a custom microprocessor or a general purpose microprocessor. The controller 203 can be dedicated to the operation of the actuator 102 or the controller 103 can also provide other functionality, such as functionally commonly associated with at least some portion of the operation of the cellular telephone 100 of FIG. 1.

A sensor 202 can sense the position, velocity, acceleration, and/or any other desired parameter associated with the load 201. The sensor 202 can sense the position of the lens 2801 (see FIG. 28) of lens assembly 103 so as to facilitate focusing of the camera 101, for example.

The sensor 202 can provide an output representative of the sensed parameter to the controller 203. The controller 203 can use the output of the sensor 202 to facilitate focusing of the camera 101, for example, as discussed further herein.

The controller 203 can control a display 204. The display 204 can include any desired information. For example, the display 204 can show the scene being photographed, can indicate whether an autofocus function is on or off and/or can indicate what portion of a scene being photographed is being used as the target for autofocusing.

User controls 206 can affect operation of the actuator 102, via the controller 203. For example, a user can operate the user controls 206 to zoom, turn autofocus on or off, and/or turn image stabilization on or off.

A memory 205 can store programs for the controller 203 and/or can store other information. For example, the memory 205 can store images captured by the camera 101, parameters related to autofocus such as distance to the subject, and/or parameters for relating values sensed by the sensor 202 to positions of the lens 2801 (see FIG. 28).

The cascaded electrostatic actuator control techniques disclosed herein may be applied to any stacked parallel-plate actuator. However, a particularly advantageous stacked architecture is disclosed in concurrently-filed U.S. application Ser. No. 13/247,847, entitled "Cascaded Electrostatic Actuator," the contents of which are incorporated by reference. In this cascaded architecture, the parallel plates are defined in a semiconductor substrate. For example, a series of parallel plates may be defined in a substrate with regard to a serpentine first electrode and a second electrode. Fingers in the second electrode interdigitate with folds in the serpentine first electrode to define the parallel plates in the plane of the semiconductor substrate. A first pair of parallel plates may defined by a first fold in the serpentine first electrode and a first finger for the second electrode. A second pair of parallel plates is defined by a second fold in the serpentine first electrode and a second finger for the second electrode, and so on. In this fashion, any number of parallel plate pairs may be defined by corresponding folds in the serpentine first electrode and fingers in the second electrode.

Numerous other cascaded architectures may be formed in the plane of the semiconductor substrate. For example a series of isolated plates may be formed through suitable etching of the substrate. Each isolated plate is surrounded by a circumferential gap that separates the plate from the surrounding substrate. The isolated plates and surrounding gaps form cells that may be stacked so that plates of substrate separate the cells. In this fashion, each isolated plate within the stack faces two opposing plates of substrate. Cascaded electrostatic actuator architectures are advantageous in that they are readily constructed using MEMS semiconductor manufacturing techniques as discussed further in the incorporated Cascaded Electrostatic Actuator application.

Figure 3:
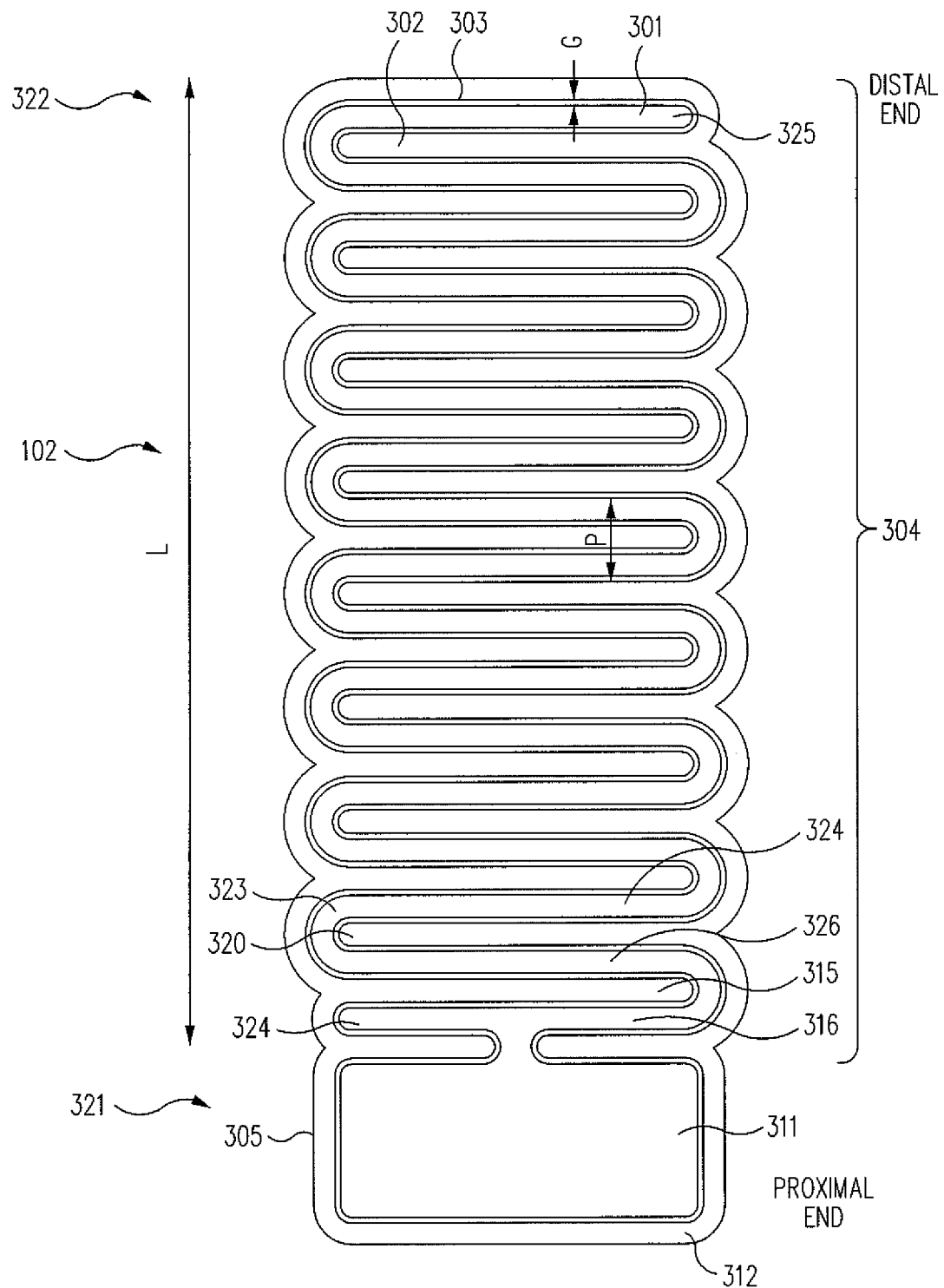
FIG. 3 shows a cascaded electrostatic actuator, in accordance with an embodiment.

An embodiment of the serpentine cascaded electrostatic actuator is shown in FIG. 3. A serpentine cascaded electrostatic actuator 103 includes a serpentine first electrode 301. Each serpentine fold in electrode 301 corresponds to a pair of parallel plates in a series of such pairs. Each pair of parallel plates is formed by a fold in serpentine electrode 301 and a finger from a second electrode 302. For example, a first pair of parallel plates is defined by a first finger plate 315 for electrode 302 and a first fold plate 316 for electrode 302. Similarly, a second pair of parallel plates for actuator 103 corresponds to a second fold plate 326 and a second finger plate 320. A third pair of parallel plates corresponds to a third finger plate 323 and a third fold plate 323, and so on. In this fashion, each serpentine fold in electrode 301 corresponds to a pair of parallel plates in actuator 103. Electrode 302 is separated from electrode 301 by a gap 303.

To provide ease of manufacture, a single crystalline silicon substrate may be etched using conventional MEMS techniques to form what will become electrode 301. The resulting trench surrounding electrode 301 may be partially filled with polysilicon to form electrode 302 as discussed further herein. Note that electrode 301 may be polysilicon in that a serpentine trench may be etched that then partially filled with polysilicon. The surrounding silicon portion of the wafer will thus form fingers of electrode 302 that cooperate with folds in electrode 301 to form pairs of parallel plates.

Electrode 302 forms opposing fingers that interdigitate with the serpentine folds of electrode 301. For example, finger 320 for electrode 302 opposes finger 315. If there is an integer number N of serpentine folds to define a stack 304, then there are N gaps 303 that may be collapsed during actuation. Stack 304 has an un-actuated (no voltage applied) height, Dimension L.

Each gap 303 can have a un-actuated width, Dimension G. With N serpentine fold in stack 304, there is thus a potential travel of N*G defining the range of motion for actuator 103. In general, the travel of the actuator 102 can be approximately the width, Dimension G, of the gap 303 for a rest or un-actuated state for actuator 102 multiplied by the number of gaps 303.

A base 305 at one end of the stack 304 can define a proximal end 321 of the actuator 102. The opposite end of the stack 304 can define a distal end 322 of the actuator 102. The base 305 can be attached to one structure and the distal end 322 of the stack 304 can be attached to another structure such that actuation of the actuator effects relative movement of the two structures.

For example, the base 305 can be attached to a stationary portion (such as the lens barrel 2803 of FIG. 28) of the lens assembly 103 and the distal end 322 of the stack 304 can be attached to the lens 2801 (see FIG. 28) to effect movement of the lens 2801 for the focusing of the camera 101. The base 305 can also facilitate electrical connection to the actuator 102, as discussed herein.

Electrical contract to the actuator 102 can be made in any desired manner. For example, electrical contact can be made to a pad 311 formed of single crystalline silicon which can be in electrical communication with first electrode 301 and electrical contact can be made to the surrounding structure 312 formed of polysilicon which can be in electrical communication with the second electrode 302.

Actuation of the actuator 102 can result in sequential or simultaneous closure of the various gaps 303 due to the electrostatic force between the electrodes 301 and 302. By varying the length of the fingers and/or the width of the fingers and corresponding serpentine folds, the ease or resistance for which any given gap 303 will close in response to electrostatic attraction between electrodes 301 and 302 may be varied as desired. As used herein, a gap closure is referred to as a snap-in motion. During the snap-in motion, the distal end of the stack 304 moves quickly or snaps from its distal most or unactuated position to its proximal most or actuated position. In one embodiment, during the snap-in motion, substantially all the N gaps 303 corresponding to stack 304 move substantially simultaneously toward one another such that the stack 304 rapidly contracts in length, Dimension L.

When unactuated, the stack 304 is expanded (has approximately the longest length, Dimension L, thereof). When actuated, the stack 304 is contracted (has approximately the shortest length, Dimension L, thereof).

Rather than all or nothing snap-in movement of the stack 304 as a whole, separate snap-in movement of separate portions or segments of the stack 304 can be provided. In this manner, more gradual, controlled movement of the actuator 102 can be provided. Incremental or partial actuation of the actuator 102 can be provided in this manner. Generally continuous actuation of the actuator 102 can be provided in this manner.

For example, the different segments of the stack 304 can have different stiffness, such that the different segments of the stack 304 snap-in at different voltages. In general, the voltage necessary for any given gap 303 to close is denoted as the pull-in voltage for that gap 303 and corresponding parallel plate pair. Thus, as the voltage is increased, different segments of the stack 304 snap-in and the length of the stack 304 changes more gradually.

Different stiffnesses of the different segments of the stack 304 can be provided by fabricating the electrode 301 and/or the electrode 302 so as to have different widths within the different segments. Different stiffnesses of the different segments of the stack 304 can be provided by fabricating the electrode 301 and/or the electrode 302 so as to have different shapes within the different segments.

Different widths, Dimension G, of the gap 303 can be used to provide different forces between given fingers of electrode 302 and corresponding surrounding serpentine folds of electrode 301 such that different gaps 303 snap in at different times (upon the application of different voltages). In this manner, smoother operation of the actuator 102 can be provided.

The motion of the actuator 102 need not be snap-in, either as a whole or for segments thereof. For example, the stiffness of the stack 304 can be substantially continuously non-linear such that the motion of the actuator 102 is substantially continuous. Thus, the distal end of the stack 304 can move generally continuously as the voltage applied to the actuator 102 is increased.

The position or state of the actuator 102 (such as the position of the distal end 322 of the stack 304) can be determined by measuring the capacitance of the actuator 102. That is, the capacitance between electrode 301 and electrode 302 can provide an indication of whether or not the actuator 102 is actuated and can provide an indication of the degree of actuation. The position of an portion of the actuator 102 can be determined by measuring the capacitance of that portion.

The actuator 102 can be fabricated by etching a trench in a single crystalline substrate. The un-etched portions of the substrate can define electrode 301. Alternatively, the trench can define electrode 301. Thus, the trench can be filled with polysilicon to define electrode 302 or electrode 301, depending upon which element the trench defines. An oxide layer can be formed to electrically isolate the electrodes during operation of the actuator 102. The fabrication process is described in further detail herein.

Figure 4:
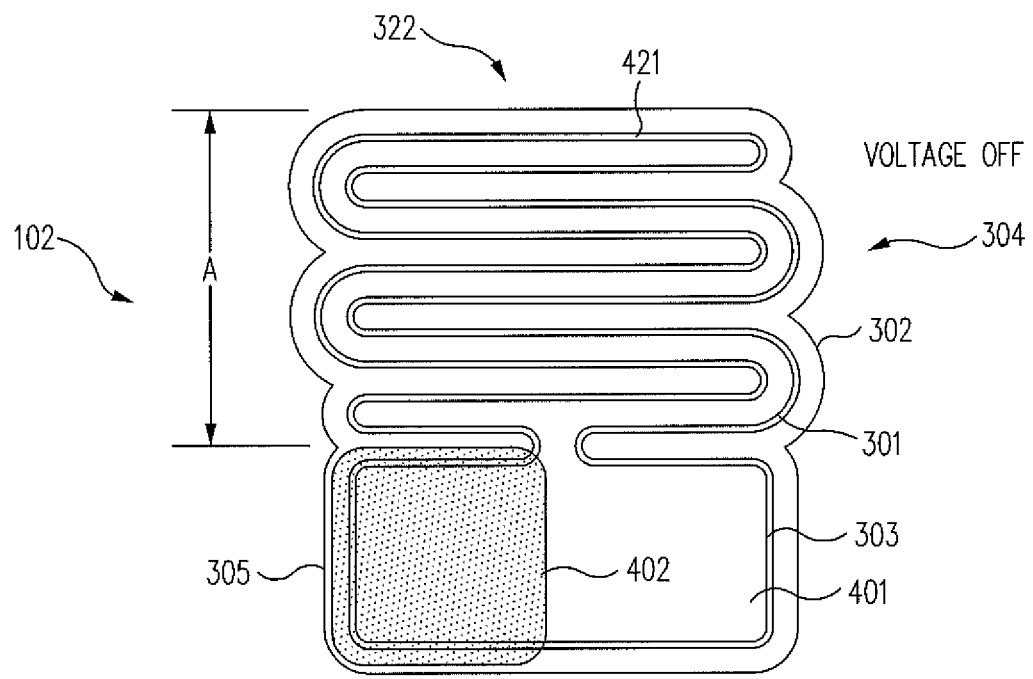
FIG. 4 shows a cascaded electrostatic actuator in an unactuated state (with a voltage off), in accordance with an embodiment.
Figure 5:
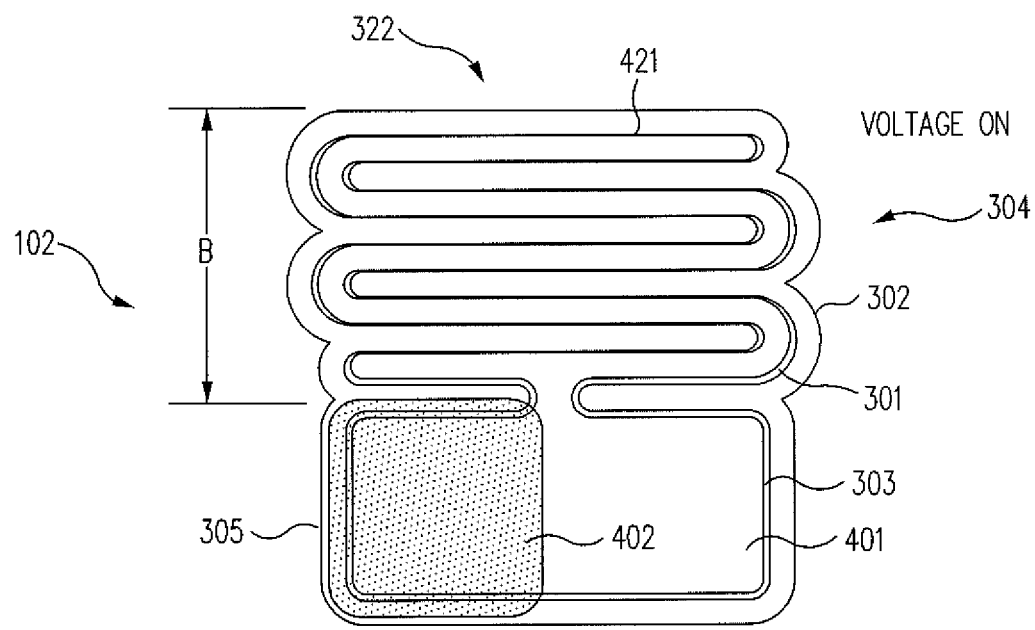
FIG. 5 shows a cascaded electrostatic actuator in an actuated state (with a voltage on), in accordance with an embodiment.

Operation of the cascaded electrostatic actuator 102 is discussed with reference to FIGS. 4 and 5. FIG. 4 shows the actuator 102 in an unactuated state (with a voltage off), in accordance with an embodiment. FIG. 5 shows the actuator 102 in an actuated state (with a voltage on), in accordance with an embodiment.

With particular reference to FIG. 4, when no voltage is applied across electrodes 301 and 302, then the charges on the electrodes are approximately the same. That is, electrodes 301 and 302 are at approximately the same electrical potential. Thus, there is no substantial force exerted between them. Since there is no substantial force exerted, the actuator 102 remains in an unactuated state.

With particular reference to FIG. 5, when a voltage is applied across electrodes 301 and 302, then the charges on the electrodes are substantially different with respect to one another. That is, electrodes 301 and 302 are at substantially different electrical potentials. Thus, there is a substantial attractive force exerted between electrodes 301 and 302. Since there is a substantial force exerted, the actuator 102 moves or snaps in to an actuated state. In the actuated state, the stack 304 is compressed or contracted with respect to the unactuated state.

When the stack 304 is contracted, gaps 303 close. An insulator, such as an oxide layer 421 can be formed upon one or both of the electrodes 301 and 302 to inhibit shorting or electrical contact therebetween.

The height, Dimension A, of the stack 304 of the unactuated actuator 102 of FIG. 4 is substantially greater than the height, Dimension B, of the stack 304 of the actuated actuator 102 of FIG. 5. Thus, during actuation, the distal end 322 of the stack 304 moves toward the base 305 of the actuator 102.

The amount of such movement can be approximately equal to the sum of the gaps 303 of the stack 304. Thus, the amount of such movement can be greater than the width of a single gap 303. An advantage of this cascaded configuration of the actuator 102 can be that more travel can be obtained by making the stack 304 thereof longer. That is, as more gaps 303 are added to stack 304, the total amount of travel of the distal end 322 of the stack 304 obtained when the actuator 102 is actuated is proportionally increased.

Another advantage of this cascaded configuration of the actuator 102 can be that more force can be provided. The electrostatic force provided by such an actuator is proportional to the cross-sectional area of the electrodes 301 and 302. Thus, increased force can be obtained by making the thickness, Dimension T of FIG. 8 and/or the width, Dimension W of FIG. 8, greater. Substantial forces can be provided by the cascaded configuration. For example, a 1 mm wide, 150 µm thick actuator 102 can produce approximately 10 grams of force.

A first electrical contact 401 and a second electrical contact 402 can be formed from or upon the base 305. For example, the first electrical contact 401 can be formed from the material of the first electrode 301, e.g., single crystalline silicon, and the second electrical contact 402 can be formed from the material of the electrode 302, e.g., polysilicon.

The first electrical contact 401 can be formed along with the first electrode 301 during the fabrication process and can thus be in electrical contact with electrode 301. The second electrical contact 402 can be formed upon the base 305 after the first electrode and the second electrode have been fabricated, as discussed herein. The second electrical contact 402 can be electrically insulated from the base 305, such as via an oxide layer (not shown) formed therebetween. The second electrical contact 402 can be in electrical contact with the second electrode 302, such as where the second electrical contact 402 is formed thereover.

Electrical connection can be made to the first electrical contact 401 and the second electrical contact 402 in the manner that electrical connection is commonly made to the pads or electrical contacts of integrated circuits. For example, such electrical connection can be made via wire bonding.

Figure 6:
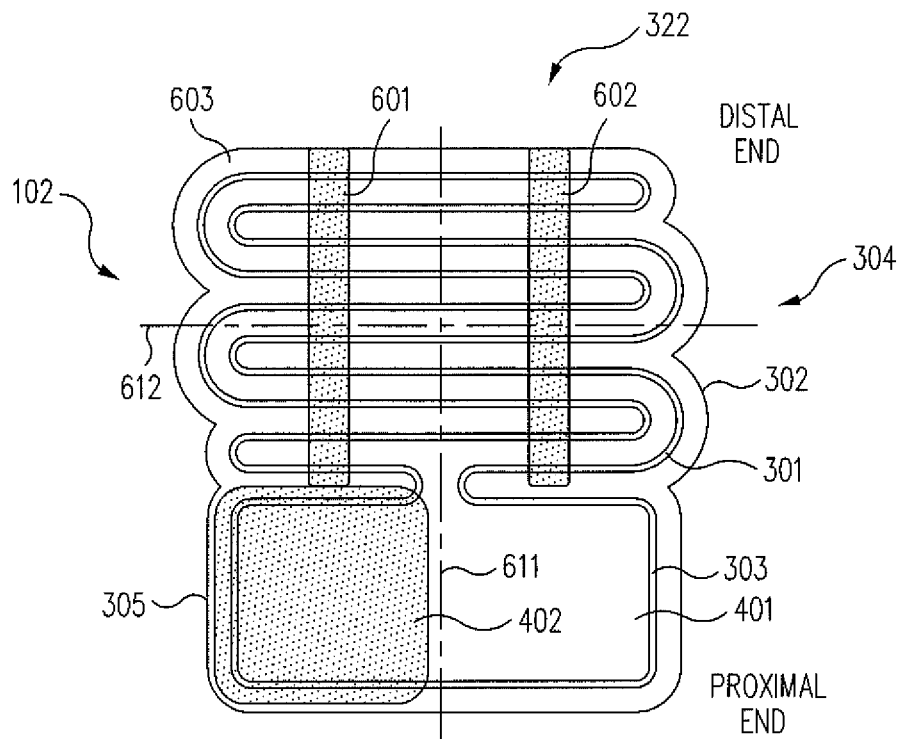
FIG. 6 shows a cascaded electrostatic actuator having two polysilicon hinges, in accordance with an embodiment.

FIG. 6 shows a cascaded electrostatic actuator 102 having a first polysilicon hinge 601 and a second polysilicon hinge 602, in accordance with an embodiment. The first polysilicon hinge 601 and the second polysilicon hinge 602 cooperate to cause the distal end 322 of the stack 304 to flex or bend downwardly, out of the plane of the actuator 102 during actuation. In this manner, a more complex, non-linear motion can be obtained.

The motion of the distal end of the stack 304 can depend, at least partially, upon the stiffness of the first polysilicon hinge 601 and the second polysilicon hinge 602. The stiffness of the first polysilicon hinge 601 and the second polysilicon hinge 602 can depend upon the width and thickness (e.g., the cross-sectional area) thereof.

The motion of the distal end of the stack 304 can have both translational (linear) and rotational (non-linear) components. Generally, the stiffer the first polysilicon hinge 601 and the second polysilicon hinge 602, the less the translational component will be and the greater the rotational component will be. The first polysilicon hinge 601 and the second polysilicon hinge 602 can have different stiffnesses, such that more complex motion of the distal end of the stack 304 can be provided.

The first polysilicon hinge 601 and the second polysilicon hinge 602 inhibit or prevent the upper surface 603 of the stack 304 from contracting when the actuator 102 is actuated. As the lower surface of the actuator contracts, generally along the centerline or movement axis 611, the distal end of the stack 304 curls down along an arc, approximately about an axis 612.

Thus, the distal end of the stack 304 can have a rotational component, and can have some linear component as well (depending upon the stiffness of the first polysilicon hinge 601 and the second polysilicon hinge 602). Such motion can be desirable in those instances where linear motion is inadequate. The use of an actuator that directly provides motion with such a rotational component has the advantage of not requiring additional structure to convert the motion from a linear actuator into a desired non-linear motion.

Figure 7:
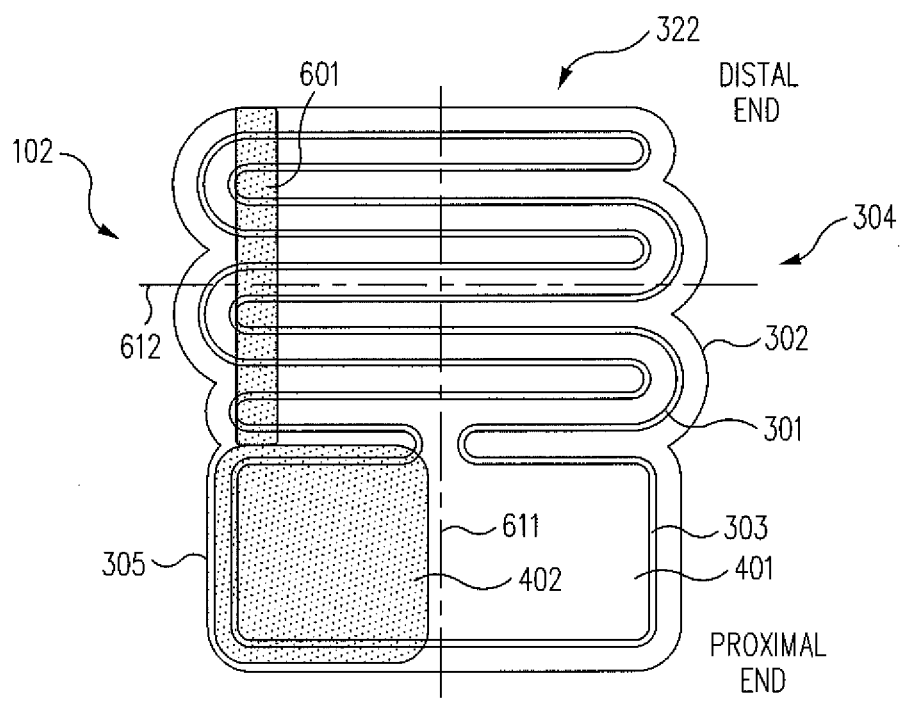
FIG. 7 shows a cascaded electrostatic actuator having one polysilicon hinge, in accordance with an embodiment.

FIG. 7 shows a cascaded electrostatic actuator having one polysilicon hinge, i.e., the first 601 polysilicon hinge, in accordance with an embodiment. The first polysilicon hinge 601 can cause the distal end of the stack 304 to flex or bend downwardly, out of the plane of the actuator 102, and to twist at the same time. Such twisting can result in some lateral movement of the distal end of the stack 304. In this manner, a more complex, non-linear motion can be obtained.

The motion of the distal end of the stack 304 can depend, at least partially, upon the stiffness of the first polysilicon hinge 601. The stiffness of the first polysilicon hinge 601 can depend upon the width and thickness (e.g., the cross-sectional area) thereof.

The motion of the distal end of the stack 304 can have both translational (linear) and rotational (non-linear) components. The rotational components can be about two or more separate axes. Generally, the stiffer the first polysilicon hinge 601, the less the translational component will be and the greater the rotational components will be.

The use of only the first polysilicon hinge 601 adds stiffness to the stack 304 asymmetrically. Such asymmetric stiffness result in the more complex bending and twisting motion of the stack 304 during actuation and de-actuation.

The first polysilicon hinge 601 can inhibit or prevent the one side (the left side as shown in FIG. 7) of the upper surface 603 of the stack 304 from contracting when the actuator 102 is actuated. As the lower surface and right side of the actuator contract generally along the centerline or movement axis 611, the distal end of the stack 304 curls down along an arc, such as about axis 612, and also twists, such as about a centerline or axis 611.

Thus, the distal end 322 of the stack 304 can have two rotational components (bending and twisting), and can have some linear component as well (depending upon the stiffness of the first polysilicon hinge 601 and/or the second polysilicon hinge 602. Such motion can be desirable in those instances where linear motion is inadequate. The use of an actuator that directly provides motion with such a rotational component has the advantage of not requiring additional structure to convert the motion from a linear actuator into a desired non-linear motion.

Figure 8:
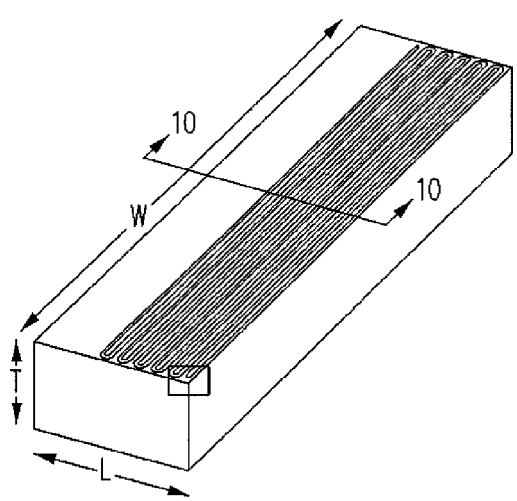
FIG. 8 shows a stack of a cascaded electrostatic actuator, in accordance with an embodiment.

FIG. 8 shows the stack 304 (or a portion of the stack 304) in perspective, in accordance with an embodiment. The stack 304 can have a thickness, Dimension T; a width, Dimension W; and a length, Dimension L. The stack 304 is made up of the first electrode 301 and the second electrode 302. Consequently, each of the electrodes have approximately the same thickness, Dimension T and approximately the same width, Dimension W.

With respect to each gap 303, electrodes 301 and 302 have opposing faces of thickness T and width W. The area of these opposing surfaces, in part, determines the electrostatic force generated across gap 303. Generally, the greater this area is, the greater the electrostatic force is across each gap 303.

Figure 9:
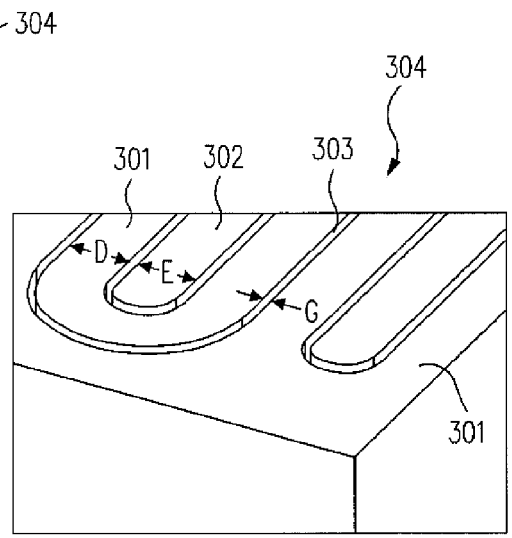
FIG. 9 shows an enlarged portion of the stack of FIG. 8, in accordance with an embodiment.

FIG. 9 shows an enlarged portion of the stack 304 of FIG. 8, in accordance with an embodiment. The serpentine fold plates for electrode 301 can have a thickness, Dimension D, which can be approximately 6 μm, for example. The finger plates formed by electrode 302 can have a thickness, Dimension E, which can be approximately 6 μm, for example. The thickness, Dimension D, of the serpentine structure for the first electrode can be the same as the thickness, Dimension E, of the fingers for the second electrode. Alternatively, these thicknesses may differ.

The gap 303 can have a thickness, Dimension G, which can be approximately 1 μm, for example. The widths of the gaps 303, Dimension G, in part, determine the electrostatic force generated across the gaps. Generally, the smaller the gap 303 is, the greater the electrostatic force is between opposing faces for electrodes 301 and 302.

The widths of the gaps, Dimension G, can all be the same. The widths of the gaps, Dimension G, can be different with respect to one another.

Figure 10:
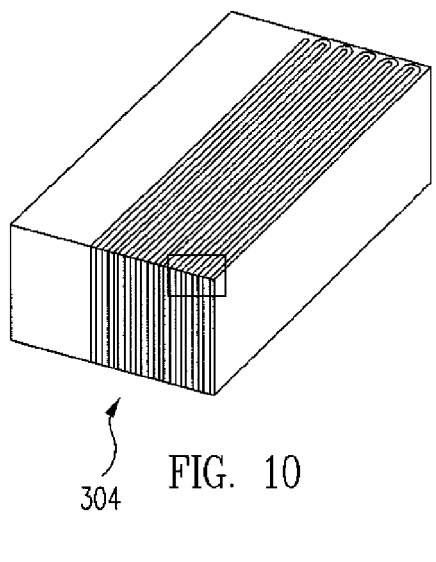
FIG. 10 shows a portion of the stack of FIG. 8, in accordance with an embodiment.

FIG. 10 shows a cross-section of the stack 304 taken alone line 10 of FIG. 8, in accordance with an embodiment. The relationship between the enclosing serpentine folds for first electrode 301, the fingers for second electrode 302, and the gaps 303 can clearly be seen.

Figure 11:
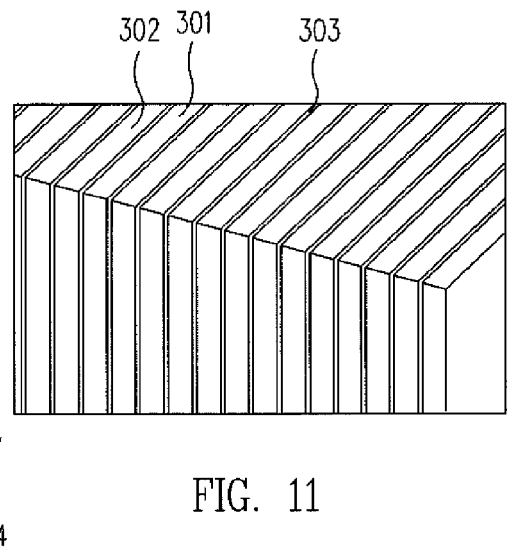
FIG. 11 shows an enlarged portion of the stack of FIG. 10, in accordance with an embodiment.

FIG. 11 shows an enlarged portion of the stack 304 of FIG. 10, in accordance with an embodiment. The gap 303 can be an air gap. Alternatively, the gap 303 can be filled or partially filled with a readily compressible material. For example, the gap 303 can contain a substantial vacuum or an inert gas.

When a voltage is applied across electrodes 301 and 302, an electrostatic force is generated therebetween. This electrostatic force is attractive since voltages of different polarities result in attraction. This attractive force tends to cause the stack 304 to collapse or contract. As the stack 304 contracts, the width, Dimension G, of the gap 303 is reduced.

The width, Dimension G, of for a given gap 303 can be reduced to substantially zero, at which point the adjacent faces for electrodes 301 and 302 can contact one another. As discussed herein, a oxide layer can be formed upon the first layers 301 and/or the second layers 302 to prevent shorting of the charges thereon.

According to an embodiment, as different, e.g., higher, voltages are applied to the actuator 102, different gaps 303 can close at different times. Such serial contracting of the stack 304 can provide a more controlled use of the actuator 102, as discussed herein.

Figure 12:
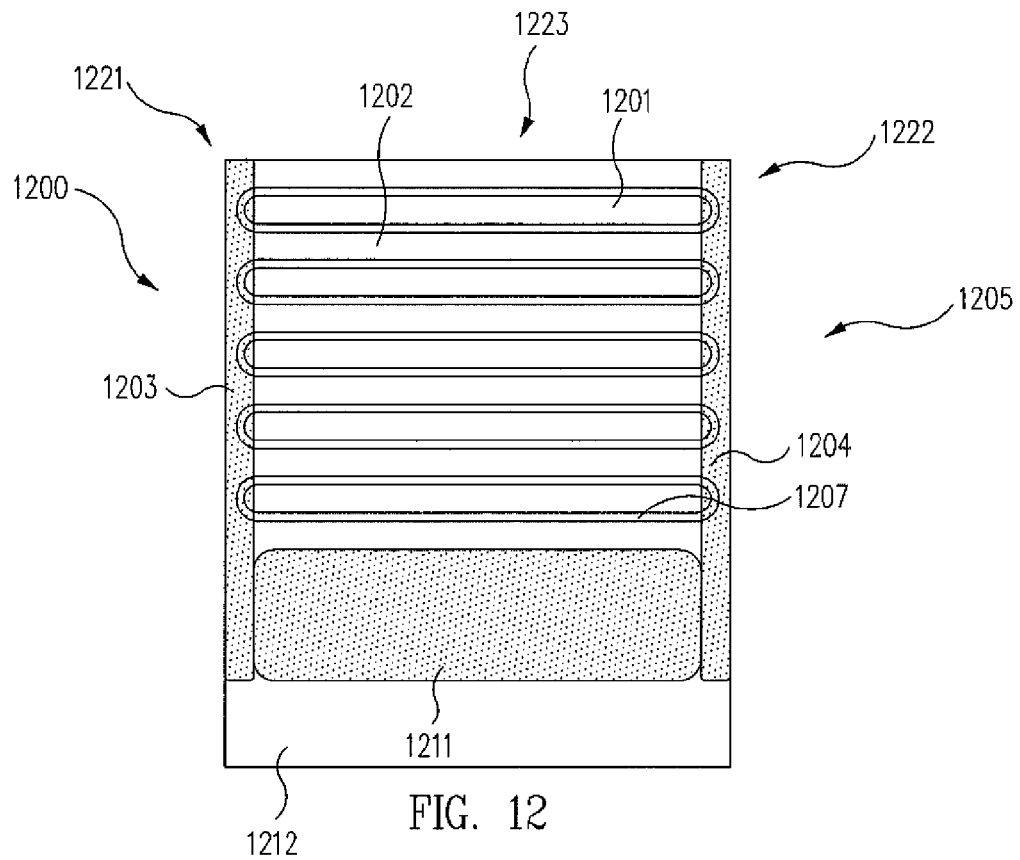
FIG. 12 shows a cascaded electrostatic actuator, in accordance with an embodiment.

Rather than use a serpentine architecture, a cascaded electrostatic actuator may be formed using isolated plates as discussed above. In such an isolated plate architecture, a plurality of isolated plates form the core of a series of cells. Each cell includes an isolated plate electrode surrounded or partially surrounded by a circumferential gap. Successive isolated plates are separated by plates of substrate such that a given isolated plate has a first face facing a first substrate plate and a second face facing a second substrate plate. For example, FIG. 12 shows a cascaded electrostatic actuator 1200 using such isolated plates, in accordance with an embodiment. According to this embodiment, a plurality of isolated plate electrodes 1201 are circumferentially surrounded by a corresponding substrate plate electrodes 1202. The isolated plates 1201 are surrounded by circumferential gaps 1207.

Since plates 1201 are circumferentially surrounded by gap 1202, they are supported by at their ends by surface polysilicon flexures, such as a first surface flexure 1203 and a second surface flexure 1204. The first surface flexure 1203 and the second surface flexure 1204 can secure plates 1201 from plate electrodes 1202 so as to inhibit relative motion therebetween in the vicinity of the surface flexures.

Figure 14:
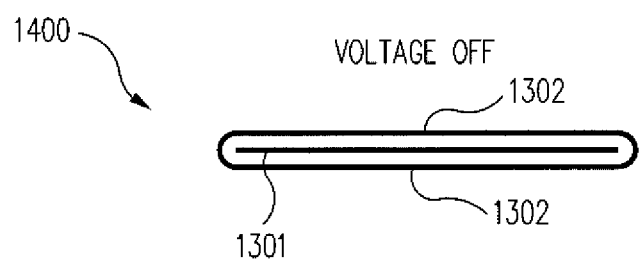
FIG. 14 shows a single cell of a cascaded electrostatic actuator in an unactuated state (with a voltage off), in accordance with an embodiment.

Each isolated plate electrode and corresponding substrate plate electrodes form a cell (shown as element 1400 in FIG. 14). Cells 1400 are stacked to form a stack 1205. Flexures 1203 and 1204 secure the ends of each isolated plate within a cell with respect to the corresponding loop electrode. The flexures prevent closure of gap 1207 in the vicinity of the flexures.

In this manner, less-contracting or non-contracting portions of the electrostatic actuator 1200 can be defined. That is, the first surface flexure 1203 and the second surface flexure 1204 can inhibit or prevent the stack 1205 from contracting along edges 1221 and 1222 thereof while allowing the stack 1205 to contract in a central portion 1223 thereof.

Electrical contract to the actuator 1200 can be made via a pad or electrical connection 1211 formed of polysilicon that can be in electrical communication with isolated plates 1201 and which can be electrically isolated from the substrate and thus from substrate plate electrodes 1202. In this fashion, each cell may be selectively activated or groups of cells may be selectively activated. Alternatively, the entire ensemble of the cells may all be selectively activated.

Electrical contact to substrate plate electrodes 1202 may be made via a substrate or electrical connection 1212 formed of single crystalline silicon, which can be electrically isolated from the isolate plate electrodes 1201. Substrate plate electrodes 1202 and isolated plate electrodes 1201 form pairs of opposing plates across each gap 1207.

Figure 13:
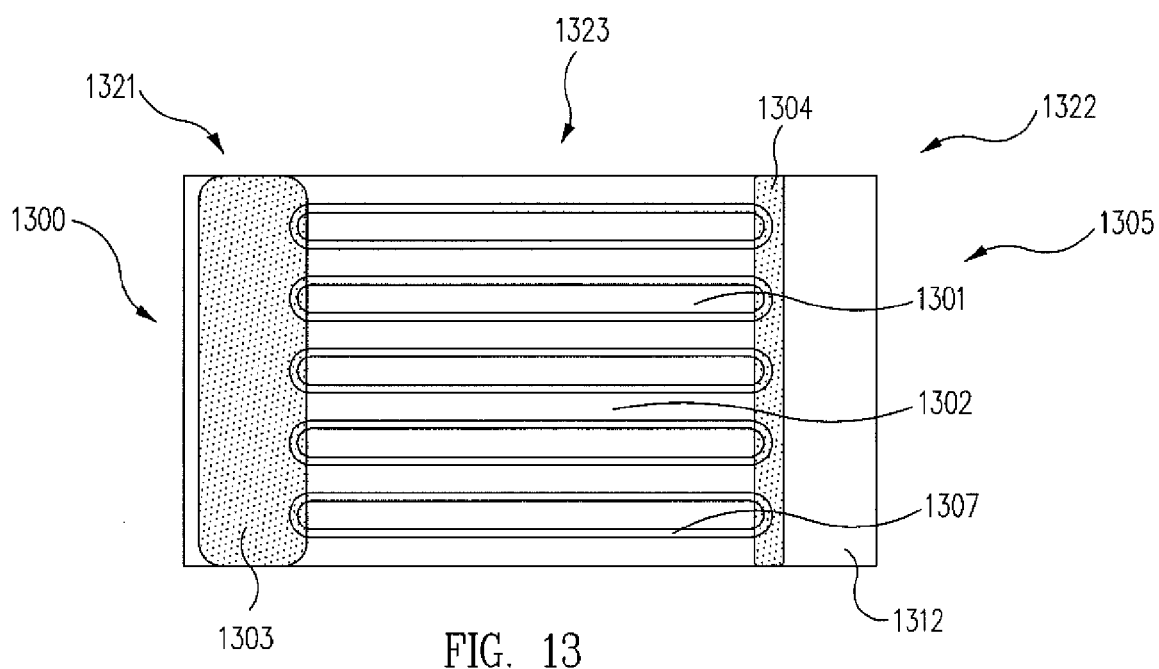
FIG. 13 shows a cascaded electrostatic actuator, in accordance with an embodiment.

FIG. 13 shows a cascaded electrostatic actuator 1300, in accordance with an embodiment. As discussed analogously with regard to FIG. 12, isolated plate electrodes 1301 alternate with substrate plate electrodes 1302. As seen in FIG. 14, a cell 1400 is thus formed by as single isolated plate electrode 1301 and a surrounding substrate plate electrodes 1302. The isolated plates 1301 are separated from the surrounding substrate plate electrodes by gaps 1307.

The isolated plate electrodes 1301 and the substrate plate electrodes 1302 can be supported by surface polysilicon flexures, such as a first surface flexure 1303 and a second surface flexure 1304. The first surface flexure 1303 and the second surface flexure 1304 can secure the isolated plate electrodes 1301 and the substrate plate electrodes 1302 to one another so as to inhibit relative motion therebetween.

In this manner, non-contractable portions of a stack 1305 can be defined. That is, the first surface flexure 1303 and the second surface flexure 1304 can inhibit or prevent the stack 1305 from contracting along edges 1321 and 1322 thereof while allowing the stack 1305 to collapse in a central portion 1323 thereof.

Electrical contract to the actuator 1300 can be made via the first surface flexure 1303 formed of polysilicon, which can be in electrical communication with the isolated plates 1301 and which can be electrically isolated from the substrate plates 1302.

Electrical contact 1312 may be formed of single crystalline silicon, which can be in electrical communication with the substrate plates 1302 and which can be electrically isolated from the isolated plates 1301.

Figure 15:
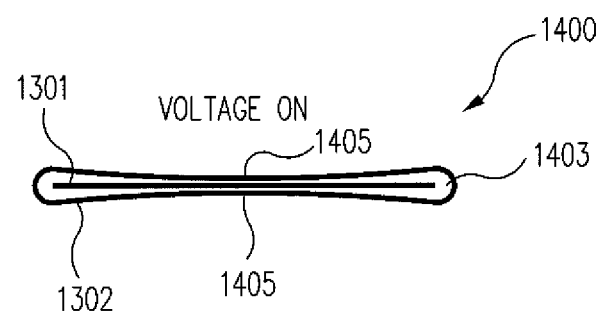
FIG. 15 shows a single cell of a cascaded electrostatic actuator in an actuated state (with a voltage on), in accordance with an embodiment.

FIGS. 14 and 15 show a single cell 1400, such as from the cascaded electrostatic actuators for FIGS. 12, 13, 16, and 17. Each of the cells 1400 of the actuators of FIGS. 12, 13, 16, and 17, for example, can have an un-actuated configuration and an actuated configuration, as discussed below.

Each cell can be approximately 200 µm long by approximately 20 µm wide, for example. Each cell can have any desired dimensions.

Each cell can be generally oval or elongated in shape. Each cell can have any desired shape.

With particular reference to FIG. 14, a single cell 1400 of an actuator is in an un-actuated state (with a voltage off), in accordance with an embodiment. The single cell 1400 can comprise a flexure (not illustrated), an isolated plate 1301, and a pair of surrounding substrate plates 1302.

In the un-actuated state, the circumferential gap 1307 can have a substantially uniform width. With particular reference to FIG. 15 a single cell 1400 of a cascaded electrostatic actuator is in an actuated state (with a voltage on), in accordance with an embodiment. In the actuated state, the cell 1400 has contracted such that central portions 1405 of the substrate plates 1302 are closer to, e.g. touching or almost touching, the isolated plate 1301. The gap 1307 is still defined, however, at end portions 1403. The isolated plate 1301 and/or the surrounding substrate plates 1302 can have an insulator, e.g., an oxide layer (not shown) formed thereon to electrically insulate the isolated plate 1301 from the surrounding plates 1302 and thus prevent shorting of the electrostatic actuator.

Figure 16:
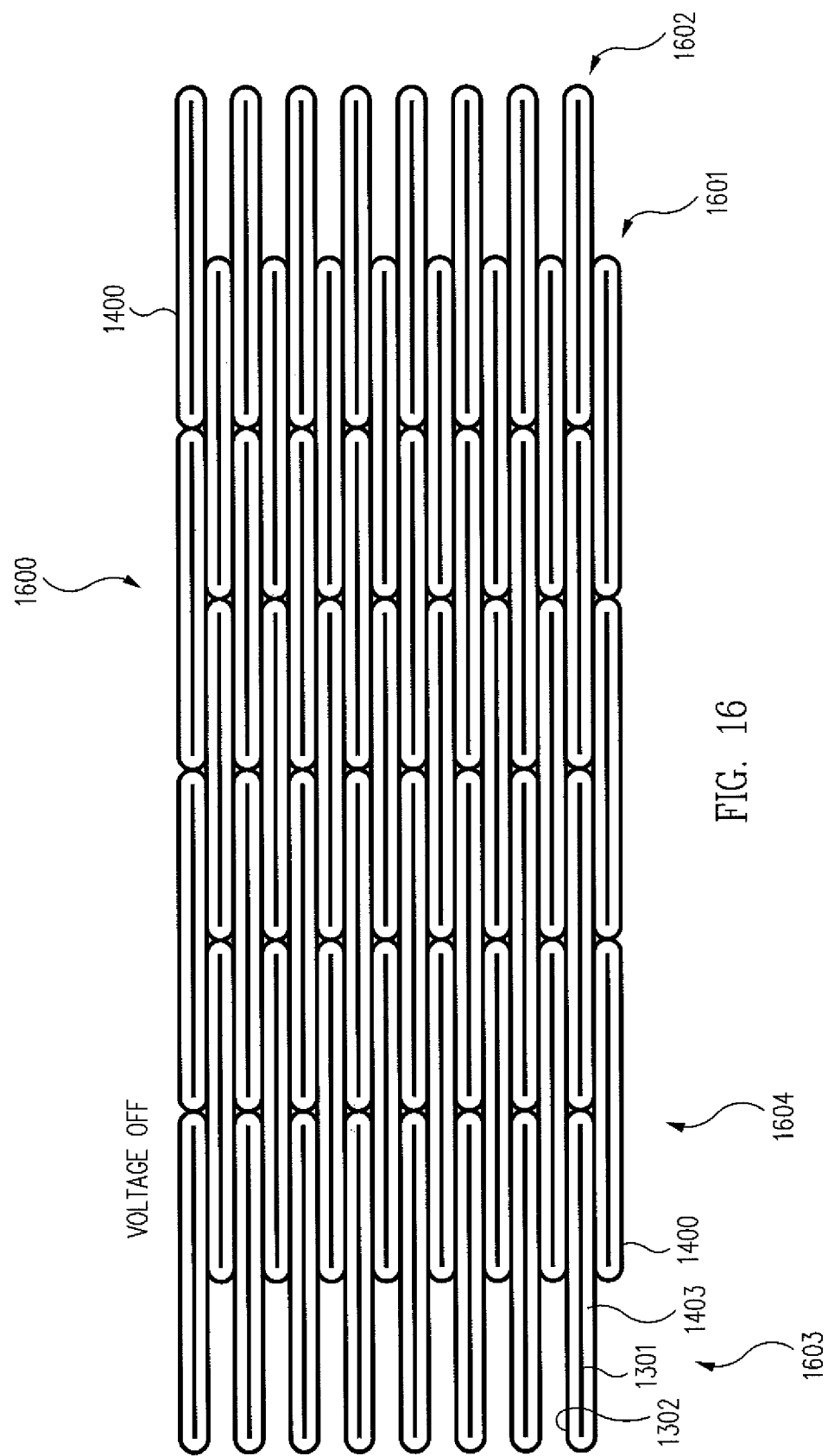
FIG. 16 shows a plurality of staggered cells of a cascaded electrostatic actuator in an unactuated state (with a voltage off), in accordance with an embodiment.
Figure 17:
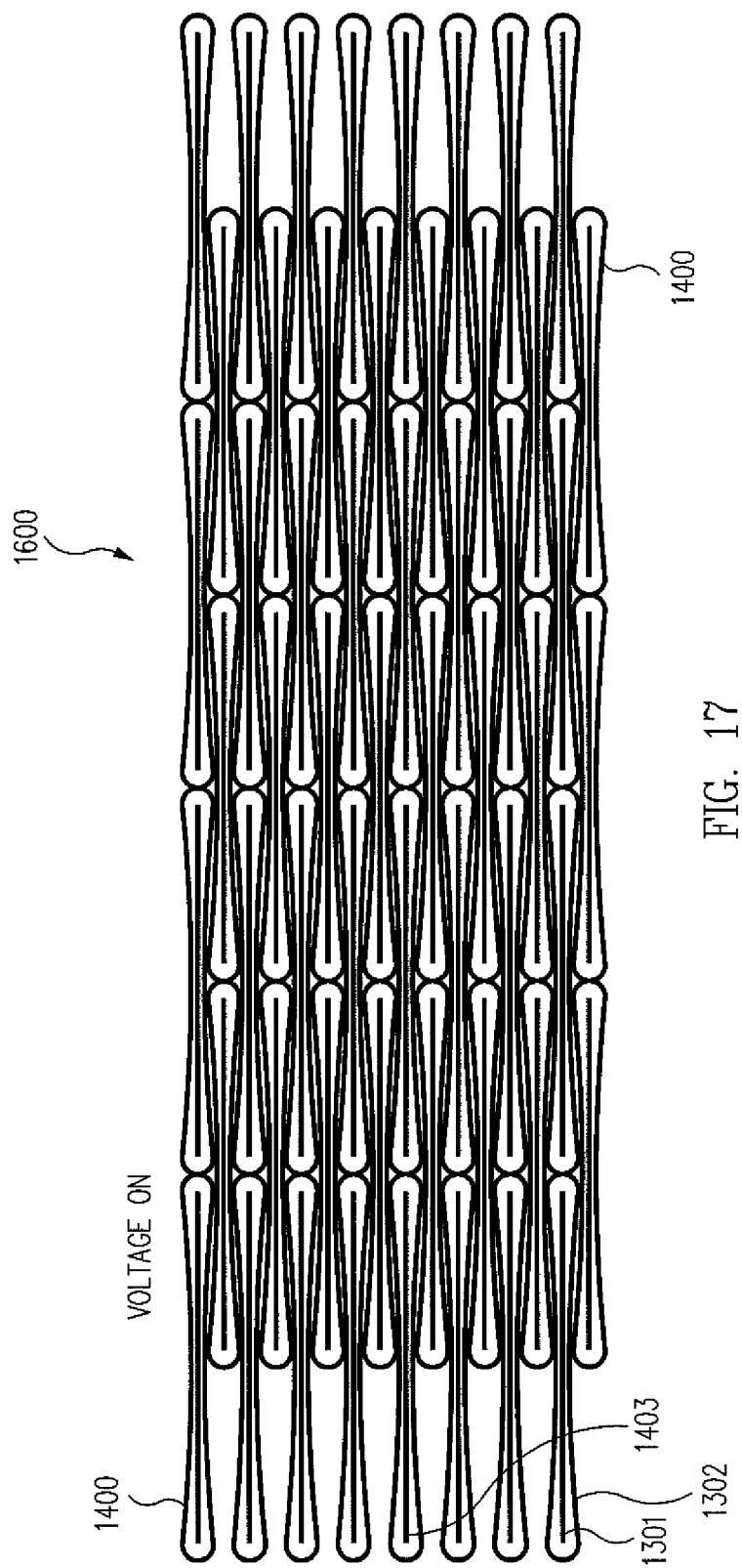
FIG. 17 shows a plurality of staggered cells of a cascaded electrostatic actuator in an actuated state (with a voltage on), in accordance with an embodiment.

FIGS. 16 and 17 show a plurality of cells 1400 that are fabricated together so as to define a stack 1600 for a cascaded electrostatic actuator. Any desired number of cells 1400 in any desired configuration can be used to define the stack 1600. The stack 1600 can have any desired number of cells 1400 in a row and can have any desired width. The stack 1600 can have any desired number of cells 1400 in a column and can have any desired height.

FIG. 16 shows a plurality of cells 1400 of a stack 1600 of a cascaded electrostatic actuator in an unactuated state (with a voltage off), in accordance with an embodiment. The isolated plates 1301 and the corresponding substrate plates 1302 of each of the cells 1400 are substantially straight and parallel with respect to one another. Alternatively, the plates 1301 and 1302 can be crooked and/or non-parallel with respect to one another.

The cells 1400 of the stack 1600 can be somewhat analogous to the cells of a muscle. Providing more cells can provide more travel and/or more force. Generally, providing more cells 1400 in each column will provide more travel and providing more cells 1400 in each row will provide more force.

The cells 1400, as shown in FIG. 16, are in a staggered configuration. That is, adjacent columns of cells 1400 overlap substantially with respect to one another. Alternatively, the cells 1400 can have a non-staggered configuration.

The cells 1400, as shown in FIG. 16, are staggered so as to have approximately 50% overlap. The cells 1400 can be staggered in a different fashion, so as to have any desired amount of overlap. For example, the cells 1400 can have 20% overlap, 25% overlap, 33.3% overlap, or any other amount of overlap.

The stack 1600 is at approximately its full height, e.g., is approximately fully extended. Since the voltage is off and no charge is being applied to plates 1301 and 1302, the stack has not contracted.

FIG. 17 shows a plurality of cells 1400 of a stack 1600 of a cascaded electrostatic actuator in an actuated state (with a voltage on), in accordance with an embodiment. The surrounding plates 1302 for each of the cells 1400 is substantially curved inwardly toward the isolated plate 1301 (as shown also in FIG. 15). Each of the cells 1400 is fully contracted. The stack 1600 is at approximately its shortest height, e.g., is approximately fully contracted. Note that as compared to the serpentine embodiments discussed earlier, stack 1600 has just one-half the travel since the overlapped ends of each cell cannot contract. However, cells 1400 may be made electrically independent of each other by having paths of polysilicon of other conductive leads patterned to define conductors to just certain ones or groups of cells. Thus, an isolated plate embodiment offers attractive selective actuation capabilities as compared to a serpentine embodiment.

Although FIG. 17 shows all of the cells 1400 in an actuated or fully contracted state, some of the cells 1400 can alternatively remain in an unactuated state due to the selective capability of an isolated plate embodiment. In this manner, the height of the stack 1600 can be more precisely controlled. For example, every other row of the cells 1400 can be actuated to provide approximately one half of the total travel of the actuator.

Further, the stack can be made to curve by actuating some cells 1400 while not actuating other cells 1400. For example, the cells 1400 on the left side of the stack 1600 can be actuated while the cells 1400 on the right side of the stack 1600 are not actuated to cause the stack 1600 to bend to the left. Additional details regarding cascaded actuators are disclosed in the incorporated-by-reference Cascaded Electrostatic Actuator U.S. patent application.

The novel properties of the cascaded gap-closing actuators discussed above require novel control techniques. For example, referring again to FIG. 2, controller 203 may be configured to command an application of a sufficiently high voltage such as 30 V across the various gaps in the cascaded electrostatic stack to snap-in all the gaps and collapse cascaded electrostatic actuator 102 to it fully actuated state. Conversely, should controller 203 apply a voltage of 0 V across all gaps, actuator 102 may relax to its un-actuated height. Actuator 102 in such an embodiment would be essentially a two-position actuator.

However, for applications such as autofocus it is desirable to achieve more granularity in the achievable actuation positions with a high degree of confidence. For example, in a serpentine embodiment, the serpentine folds may be of varying length such that the stack forms a trapezoidal shape. An analogous length variation may be implemented in an isolated plate cascaded electrostatic actuator embodiment. Regardless of the actuator type, the varying lengths of the resulting plate pairs thus have varying resistances to snap-in. Once a given gap has closed, the resulting greatly increased electrostatic attraction will maintain the gap closed at voltages lower than that required for the initial snap-in. There is thus hysteresis with respect to the voltages for snap-in versus the voltage at which closed gaps open.

Figure 18:
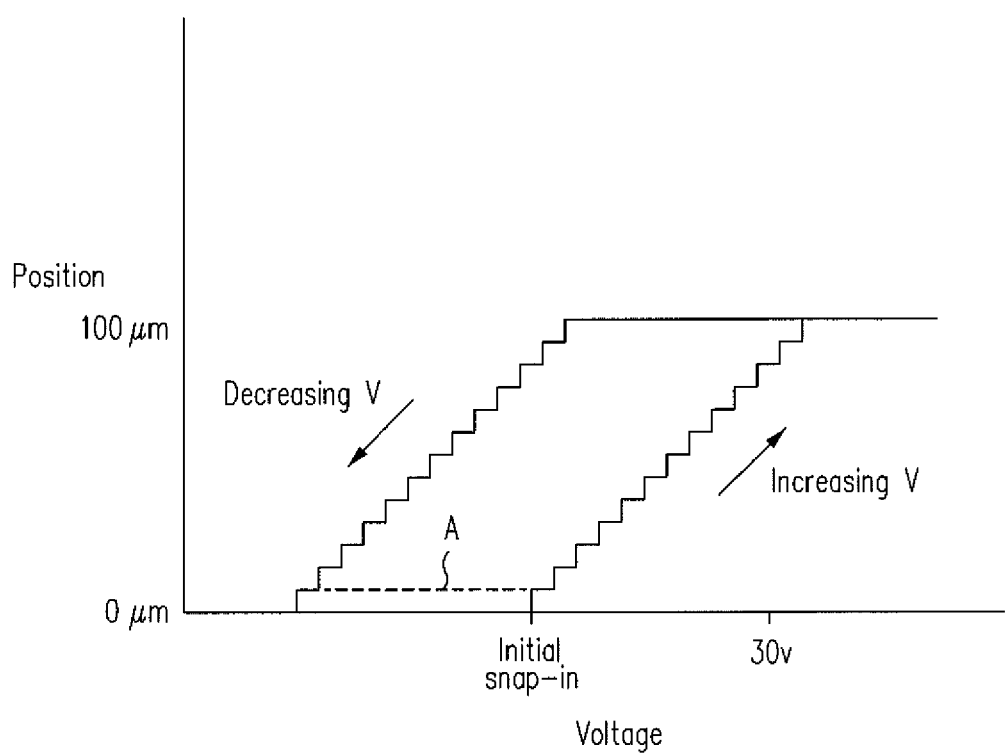
FIG. 18 shows a position versus voltage diagram for a first cascaded electrostatic actuator control method.

The resulting serpentine cascaded actuator may thus be selectively actuated across various intermediate positions between closure of all gaps and having all gaps completely relaxed. Each gap will snap-in at differing voltages. The more flexible plates will snap-in at lower voltages whereas the stiffer plates will snap-in at higher voltages. The gaps will then open at correspondingly lower voltages according to the actuator's hysteresis. The resulting actuator could then be controlled responsive to this hysteresis. For example, controller 203 may control a variable serpentine cascaded actuator as shown by FIG. 18. The actuator can be selectively actuated over a range of intermediate positions to contract from a relaxed position (0 µm) to a fully actuated position (100 µm). The various voltage may be stored in a memory or look-up table within controller 203. For example, an initial gap closes at the initial snap-in voltage. The actuator travel is thus approximately 5 µm for that initial gap closure. As the voltage is increased, additional gaps are closed such that the full travel of 100 µm is achieved at 30 V. Should the actuator need to expand from any given position, the hysteresis is accounted for by the look-up table. For example, to relax the initial gap closure, the voltage would be decreased as shown by path A to place the actuator back into the completely un-actuated state.

Figure 19:
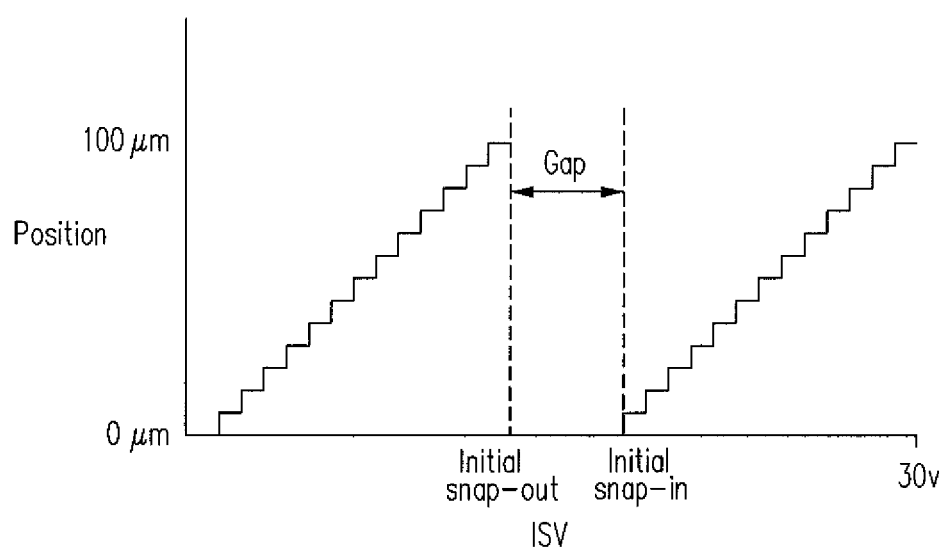
FIG. 19 shows a position versus voltage diagram for a second cascaded electrostatic actuator control method.

Note that the accounting for such hysteresis may be undesirable in certain applications. Thus, the serpentine cascaded electrostatic actuator may be configured to have the travel versus voltage behavior shown in FIG. 19. After the actuator has been completely actuated, there is a voltage at which the actuator will relax an initial gap, which is designated herein as the initial snap-out voltage. In the embodiment of FIG. 19, there is a gap between the initial snap-in voltage and the initial snap-out voltage. In contrast, the voltage control behavior shown in FIG. 18 has no such gap. Because of the gap, a controller could use a voltage within the gap (e.g., 15V) to maintain a given position. So long as the actuator is held at the gap voltage, no gaps will close or relax—the actuator will maintain whatever current actuation state it has. The actuator could then be stepped up by another gap closure by a pulsed maximum voltage such 30 V. In contrast, a short pulse of 0 V would relax the actuator by a selected gap. In this fashion, controller 203 controls the cascaded actuator analogously to a linear stepper motor.

Figure 20A:
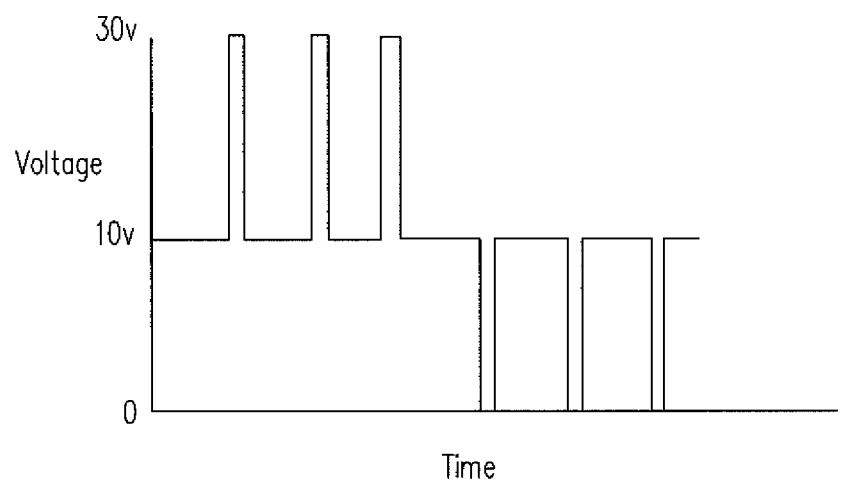
FIG. 20a shows a voltage pulse waveform for controlling a cascaded electrostatic actuator.
Figure 20B:
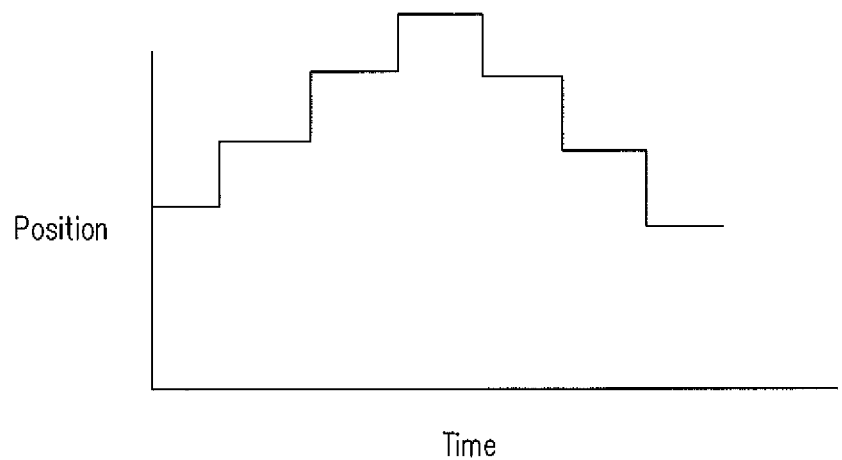

As seen in FIG. 20a, controller 203 commands high voltage pulses (e.g., 30V) to close gaps sequentially. Thus, as seen in FIG. 20b, a gap closes corresponding to each high pulse in FIG. 20a. Conversely, controller 203 commands low voltage pulses (e.g., 0V) to open gaps sequentially.

Figure 21:
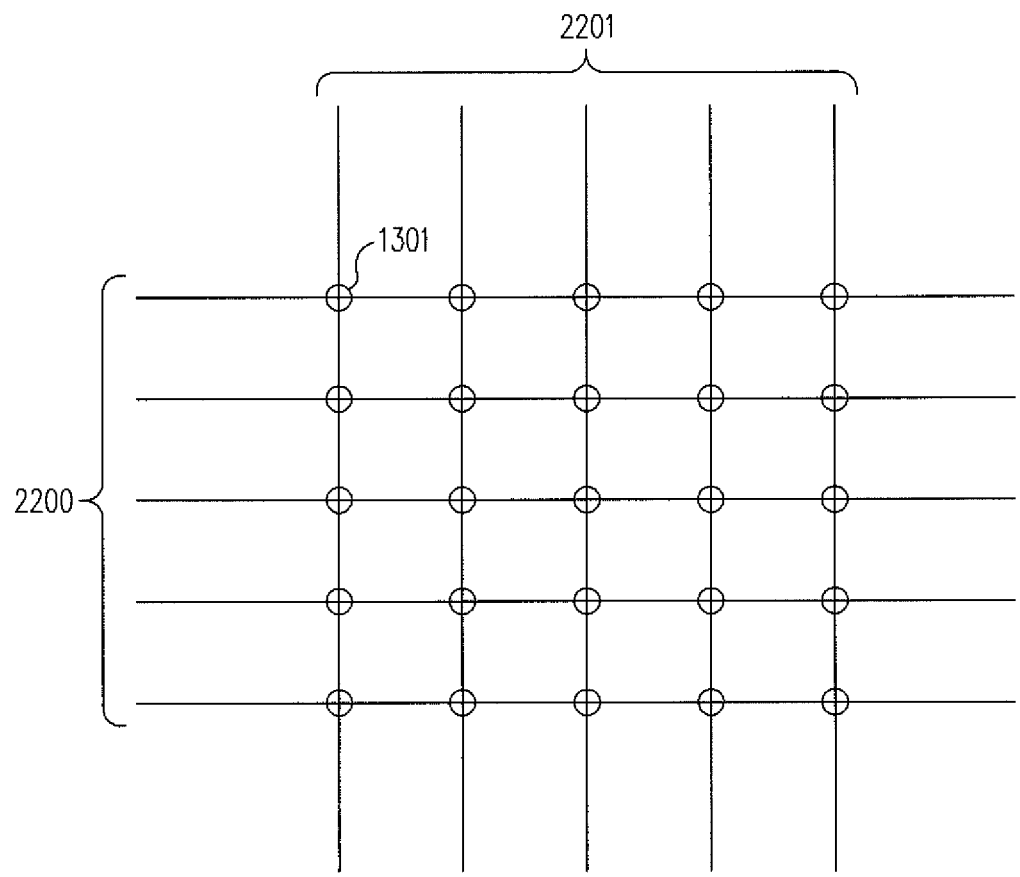
FIG. 21 shows a row and column control architecture for selectively addressing distributed actuators.

Referring again to the isolated plate embodiments such as shown in FIG. 16, each isolated polysilicon plate 1301 may be arranged in a row/column matrix. For example, a first row 1601 of plates 1301 is beneath a second row 1602, and so on. Similarly, plates 1301 form a first column 1603 followed by a second column 1604, and so on. Because each isolated plate 1301 may be electrically addressed separately from the remaining isolated plates, a control architecture for such a cascaded actuator thus becomes analogous to accessing a memory. Each row of plates 1301 may be addressed by a "word" line row conductor whereas each column of plates 1301 is similarly addressed by a "bit" line column conductor. The resulting row and column conductors cross the matrix of isolated plates as shown in FIG. 21. A row conductor 2200 corresponds to each row of plates 1301 (the plates are shown in simplified form for illustration clarity). Similarly, a column conductor 2201 corresponds to each column of plates 1301.

Figure 22:
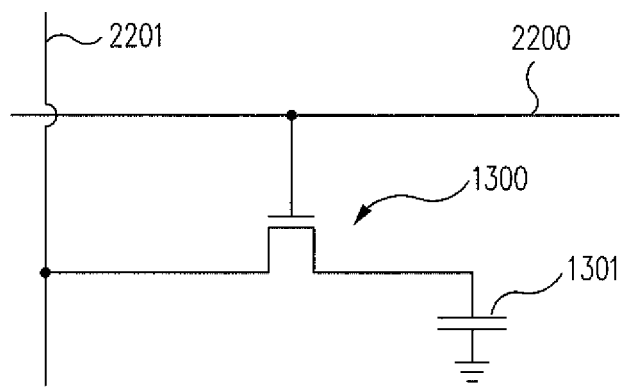
FIG. 22 shows a row/column intersection in the architecture of FIG. 22.

The row and column conductors should be on separate layers to keep them electrically isolated from each other. For example, the row conductors may be formed in a first polysilicon layer whereas the column conductors are formed in a second polysilicon layer. As seen in FIG. 22, each plate 1301 is coupled to an adjacent transistor 2300 formed in the substrate. The gate of transistor 2300 is driven by row conductor 2200 whereas column conductor 2201 drives a drain of transistor 2300. Thus, when a voltage for row conductor 2200 is raised, column conductor 2201 can charge plate 1301 or discharge this plate, depending upon the column conductor voltage. For example, if column conductor 2201 is charged to a suitably high voltage such as 30 V, then plate 1301 would be similarly charged, thereby closing the associated gap (shown as element 1403 in FIG. 16) about this electrode. Conversely, if column conductor 2201 is grounded, asserting row conductor 2200 would ground plate 1301 so as to close the associated gap. In this fashion, the actuators associated with a given asserted row conductor may be closed or opened as controlled by the corresponding column conductor voltages.

The row conductors are arranged in parallel and thus may be directly addressed by controller 203 (FIG. 2) through a parallel interface. An analogous parallel interface would address the column conductors. However, a serial-to-parallel interface converter may be used to reduce the chip routing. Moreover, although a row and column addressing of a cascaded electrostatic actuator is particularly advantageous, it will be appreciated that the row and column addressing discussed herein may be readily applied to any distributed plurality of actuators capable of being individually addressed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A device comprising:
   a plurality of actuators arranged into a plurality of rows and a plurality of columns;
   a plurality of row conductors corresponding to the plurality of rows;
   a plurality of column conductors corresponding to the plurality of columns; and
   a controller configured to select at least one of the actuators in a row by raising a voltage on the corresponding row conductor to couple each selected actuator to its corresponding column conductor,
   wherein each actuator is a parallel-plate actuator comprising an isolated plate surrounded by a gap separating the isolated plate from a surrounding substrate, and
   wherein a corresponding surrounding substrate of the selected actuator is deformed when the selected actuator is actuated.

2. The device of claim 1, wherein each isolated plate comprises polysilicon.

3. The device of claim 1, wherein actuators in a column are actuated simultaneously to provide an aggregated travel distance or force in the column.

4. A method, comprising:
   selecting at least one electrostatic actuator for actuation from a plurality of electrostatic actuators, the electrostatic actuators being arranged in rows and columns corresponding to a plurality of row and column conductors, and
   driving the selected actuator by raising the voltage on the corresponding row conductor to couple the selected actuator to the corresponding column conductor,
   wherein each electrostatic actuator is a parallel-plate actuator comprising an isolated plate surrounded by a gap separating the isolated plate from a surrounding substrate, and
   wherein a corresponding surrounding substrate of the selected actuator is deformed when the selected actuator is actuated.

5. The method of claim 4, wherein the raising the voltage on the corresponding row conductor causes a transistor to conduct that couples the selected actuator to the corresponding column conductor.

6. The method of claim 5, further comprising driving the corresponding column conductor with a first voltage to drive the selected actuator to contract.

7. The method of claim 6, further comprising driving the corresponding column conductor with a second voltage to drive the selected actuator to expand.

8. The method of claim 7, wherein the first voltage is higher than the second voltage.

9. The method of claim 4, wherein the at least one actuator comprises a row of actuators.

10. The method of claim 4, wherein a plurality of electrostatic actuators in a column are actuated simultaneously to provide an aggregated travel distance or force in the column.

* * * * *